United States Patent [19]

Apitz et al.

[11] 4,450,349
[45] May 22, 1984

[54] BAR CODE WITH OPTICAL READING DEVICE

[75] Inventors: Siegfried Apitz, Pforzheim; Rolf Nonnenmann, Karlsbad, both of Fed. Rep. of Germany

[73] Assignee: International Standard Electric Corporation, New York, N.Y.

[21] Appl. No.: 355,017

[22] Filed: Mar. 5, 1982

[30] Foreign Application Priority Data

Mar. 11, 1981 [DE] Fed. Rep. of Germany ......... 310928

[51] Int. Cl.³ .............................................. G06K 7/10
[52] U.S. Cl. ................................... 235/462; 235/463; 235/467; 235/469
[58] Field of Search ....................... 235/462, 463, 467

[56] References Cited

U.S. PATENT DOCUMENTS

| | | | |
|---|---|---|---|
| 3,471,684 | 10/1969 | Berezov | 235/469 |
| 3,513,320 | 5/1970 | Weldon | 235/469 |
| 4,147,295 | 4/1979 | Nojiri | 235/463 |
| 4,308,455 | 12/1981 | Bullis | 235/463 |
| 4,323,772 | 4/1982 | Serge | 235/463 |

Primary Examiner—Harold I. Pitts
Attorney, Agent, or Firm—James B. Raden; William J. Michals

[57] ABSTRACT

The novel bar code, in the spaces (4) between neighboring code bars (1) which have a width greater than one modular width, with the modular width always being larger than the diameter of the scanning spot (55) of a reading device, contains counting-line marks (5, 6) or counting bars (7). The thickness of the counting line marks is substantially smaller than the diameter of the scanning spot, for example one third of the width of the code bars. The counting bars have a reflectance lying between that of the spaces and that of the code bars. As a result of these measures, at the output of a photoreceiver (9) of a reading device, pulses (31) of a smaller amplitude than that of the pulses (30) formed by the code bar, are generated. By these pulses there is formed a counting clock by which the decoding is rendered independent of the scanning speed.

12 Claims, 6 Drawing Figures

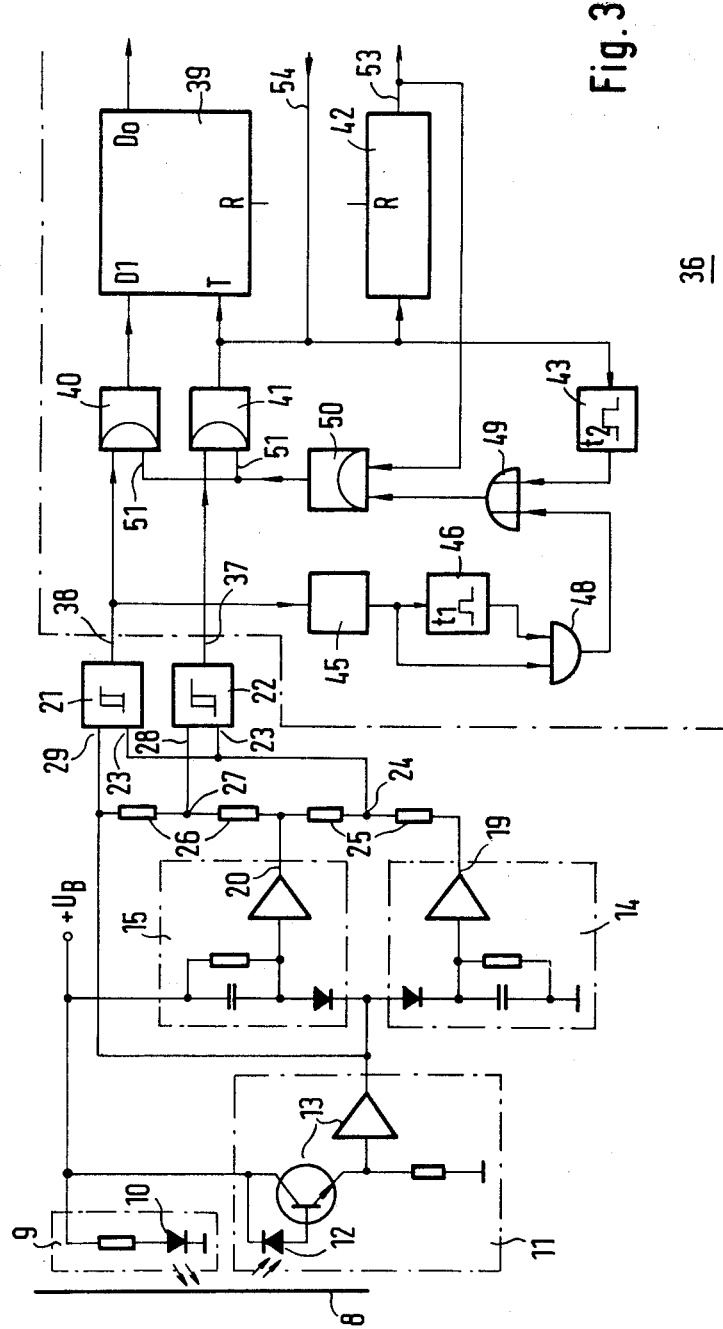

BAR CODE WITH OPTICAL READING DEVICE

BACKGROUND OF THE INVENTION

The invention relates to a bar code of the type set forth in the preamble of claims 1 and 3, capable of being read with the aid of a reading device, and to an associated reading device of the type set forth in the preamble of claim 6.

There are known various types of bar codes. They consist of a number of lines or bars of different widths which are arranged in parallel with their longitudinal sides and are separated from one another by spaces of different widths. They enjoy great increasing acceptance because of requiring little investment for the scanning process and the character recognition.

From the DIN 66 236 standard there is known a bar code having machine-optically recognizable characters, with each character consisting of a group of bars and spaces, and with the widths of both the bars and the spaces of each character amounting to an integer multiple of one module. Moreover, the length of one intelligence character of this code corresponds to a certain, predetermined number of modules. This code, however, is only machine-readable, i.e., with the aid of a mechanically guided scanner, in order to adhere to the modular spacing which is necessary for safeguarding a faultless reading during the scanning.

SUMMARY OF THE INVENTION

The well known CODABAR code, however, is also suitable for being scanned with the aid of a portable or hand-held bar code reader. In this code, each character consists of four bars and three spaces. For both the bars and the spaces two widths are available of which the larger width amounts to almost three times that of the smaller width. During the scanning, in this conventional code there is only distinguished between narrow and wide widths. Yet, when scanning this conventional bar code with a hand-held bar-code reader there often occur reading errors when the scanning is not carried out at an approximately constant guiding speed of the bar code reader.

It is the object of the invention to design a bar code of the type mentioned hereinbefore, in such a way that also in the case of greatly varying scanning speeds, a correct reading is carried out by the bar-code reader at a high reliability and, in addition thereto, to provide a reading device suitable for reading such a bar code.

According to the invention, this object is achieved in an advantageous manner by the technical features set forth in the characterizing part of claim 1 as well as by the technical features set forth in the characterizing part of claim 3.

By the invention there is introduced a further reflectance value for the optical scanning, which ranges between the reflectance value of the bars and the reflectance value of the spaces. With the aid of these counting bars lying within the spaces, it is possible in an advantageous manner to measure (count) the space widths and to utilize in this way the different space widths for serving as a different information.

Preferred embodiments of the bar codes according to the invention are set forth in the subclaims 2, 4 and 5.

The technical features set forth in the characterizing part of claim 6 solve in an advantageous manner the problem underlying the invention, i.e., of designing a reading device permitting the optical scanning of a bar code as set forth in the preamble of claim 6, in such a way as to be suitable for reading (scanning) a bar code according to the invention.

Advantageous developments and further embodiments of a reading device according to the invention are set forth in the subclaims 7 to 11.

BRIEF DESCRIPTION OF THE DRAWING

In the following, the invention will now be explained in greater detail with reference to some examples of embodiment schematically shown in FIGS. 1 to 4 of the accompanying drawings, in which:

FIG. 3 shows a block diagram relating to an optical reading device suitable for reading the bar codes shown in FIGS. 1 and 2, and FIGS. 4a, 4b and 4c show diagrams of an electric scanning signal as produced by the photo-receiver of an optical reading device as shown in FIG. 3, during the scanning of one of the bar codes as shown in FIGS. 1 or 2.

DESCRIPTION OF THE PREFERRED EMBODIMENT

Figure 1:
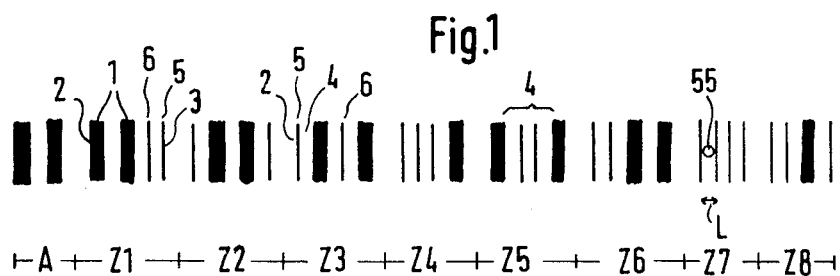
FIG. 1 shows a bar code with counting line marks arranged in the individual spaces.

The bar code as shown in FIG. 1 contains one initial character A and several subsequently following intelligence characters Z1 to Z8. The information content of each character can be recognized from the number of code bars 1 of the character and from the position of the code bars within the character. The position of the code bars is determined by their spacing from the character start 2 or the character end 3. When a space 4 is provided between the character start or the character end and a code bar of the character, then a counting line mark 5 is arranged at this particular character start or character and. If the space between a code bar 1 and the code start or the code end, or between a further neighbouring code bar of the character is substantially greater than one modular width L, then a counting line mark 6 is arranged in this space for each further modular width L. One modular width L is identical to the minimum width of a space or code bar, which is required for scanning the space without being affected by adjoining code bars, or which is necessary for scanning a code bar without being affected by the adjoining spaces. The distance between the counting line marks 5 or 6 and from the neighbouring code bars 1 is at least as large as one modular width L. The thickness of the counting line marks 5 and 6 is substantially smaller than one modular width L, and amounts preferably to one third of this modular width. The code bars at least have a width corresponding to one modular width. One intelligence-bearing character Z1, Z2 through Z8 contains, in the given example of embodiment, altogether always four counting line marks and/or code bars, with characters (Z7) without code bars also being likely to occur.

Figure 2:
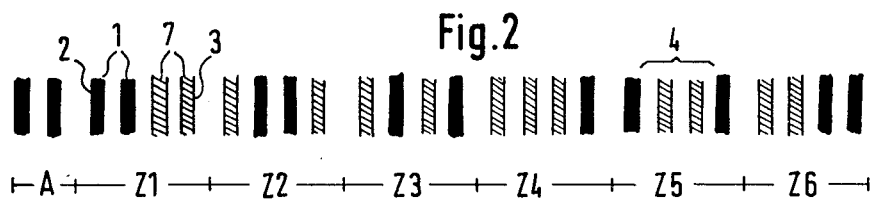
FIG. 2 shows a bar code with counting bars arranged in the individual spaces.

The bar code as shown in FIG. 2 differs from the code as shown in FIG. 1 in that it, instead of the counting line marks 5 and 6 of the bar code as shown in FIG. 1, contains counting bars 7, with the reflectance thereof ranging between the reflectance of the spaces 4 and the reflectance of the code bars 1, and with the bar width thereof being at least as large as one modular width L. In the given example of embodiment, the counting bars 7 are made out of the same material as the code bars 1, and are deposited in the form of a graduated grating covering the surface by about 50%, on to the surface of the recording medium bearing the bar code.

In this way it is achieved that the reflectance of the counting bars will always be lying in about the middle between the reflectance of the spaces and the reflectance of the code bars, independently of the kind of reading station of the optical reading device which is used for the scanning.

The block diagram of an optical reading device which is capable of recognizing a bar code as shown in FIGS. 1 or 2, is shown in FIG. 3. Its reading station which, for scanning a bar code deposited on a recording medium 8, e.g., a code of the type shown in FIG. 2, is led over the bar code, contains a photo-transmitter 9 with a light-emitting diode 10, and a light receiver circuit 11 with a photo diode 11 and a subsequently arranged amplifier circuit 13. To the output of the amplifier circuit two peak-rectifier circuits 14 and 15 are connected, of which the one peak-rectifier circuit 14 rectifies the voltage peaks of the output voltage of the photo-receiver circuit 11, being nearest to the potential $+U_B$, and of which the other peak rectifier circuit 15 rectifies the voltage peaks of the output voltage of the light receiver circuit 11, being nearest to the ground potential.

Figure 4A:
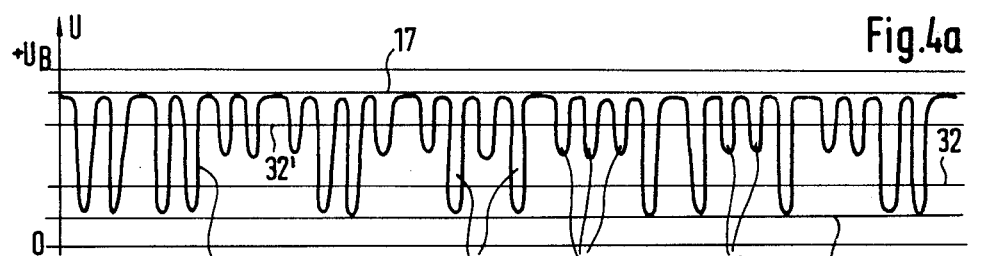
Figure 4B:
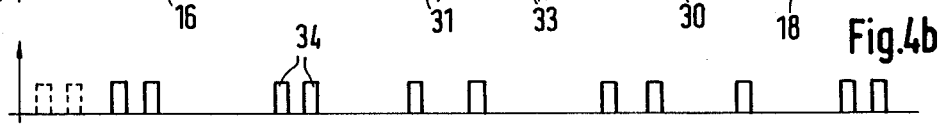
Figure 4C:

The shapes of the voltage waveform of the output signal 16 as resulting from the scanning of the bar code as shown in FIG. 2, at the output of the light-receiver circuit 11, as well as of the voltage waveform of the signals 17 and 18 appearing at the outputs 19 and 20 of the two peak rectifier circuits 14 and 15, are shown in the diagram of FIG. 4a. The peak rectifier circuit 14 produces at its output 19 an output signal 17 whose voltage value is the mean value of the voltage peaks of the output signal 16 being nearest to the potential $+U_B$, and the peak rectifier circuit 15 produces at its output 20 an output signal 18 whose voltage value is the mean value of the voltage peaks of the output signal 16 of the photo-receiver circuit 11, being nearest to the ground potential. The output 20 of the peak rectifier circuit 15 forms the reference potential for two threshold switches 21 and 22 arranged subsequently to the output of the photo-receiver circuit. The inputs 23 of the threshold switches 21 and 22 are connected to the tap 24 of a voltage divider 25 inserted between the outputs of the peak rectifier circuits 14 and 15. A second voltage divider is connected between the output 20 of the peak rectifier circuit 15 and the output of the photo-receiver circuit 11. The tap 27 of this voltage divider 26 is connected to the signal input 28 of the threshold switch 22 while the signal input 29 of the threshold switch 21 is connected directly to the output of the photo-receiver circuit 11. The division ratio of the voltage divider 25, with respect to its base at the output 20, is so adjusted that the voltage value at the tap 24 as indicated by the line 32 in the diagram of FIG. 4a, will come to lie between the voltage value of the output signal 18 of the peak rectifier circuit 15 and the voltage value of the peaks 33 of the smaller pulses 30 contained in the output signal 16 as produced by the counting bars 7 of the scanned bar code at the output of the photo-receiver circuit. In this way, the threshold switch 21 only produces an output pulse 34 when the output signal 16 of the photo-receiver circuit shows to have a pulse 31 resulting from a code bar (diagram in FIG. 4b).

The voltage divider 26 is set in such a way that the smaller pulses 30 contained in the output signal 16 of the photo-receiver circuit, originating with the counting bars 7 of the bar code, at the tap 27 of the voltage divider 26 fall short of the set voltage value (line 32) as adjusted at the tap 24 of the other voltage divider 25. A line 32' in the diagram of FIG. 4a corresponds to the curve of the threshold value at the input 23 of the threshold switch 22 when the signal curve at the input 28 of this threshold switch 22 is enlarged to the size of the output-signal curve 16.

In this way the pulses 30 as well as 31 produce at the output of the threshold switch 22, pulses 35 which, as clock pulses, are applied to a clock input 37 of a circuit arrangement 36 arranged subsequently to the threshold switches, for reconditioning the information contained in the output signal 16. The output of the threshold switch producing the pulses 34 for the code bars, is connected to a data input 38 of the reconditioning circuit.

By the two peak rectifier circuits 14 and 15 and the two voltage dividers 25 and 26 there is achieved a ratio of the voltage values 32 and 32' to the amplitude values of the pulses 30 and 31 of the output signal 16 of the photo-receiver circuit 11 which is extensively independent of both the reflectance of the code and counting bars and of the reflectance of the spaces.

The reconditioning circuit 36 is essentially composed of a shift register 38 with two gate circuits 40 and 41 preceding its data input D1 and its clock input T, as well as of a clock counter 42, of a first timing circuit 43 connected to the clock line behind the gate circuit 41, of a two-stage counter 45 connected ahead of the gate circuit 40 to the data line, with this counter comprising a subsequently arranged second timing circuit 46. At the beginning of the character scanning, the two gate circuits 40 and 41 are blocked. The two data pulses 34 corresponding to one initial character A of the scanned set of words of the bar code, are applied to the two-stage counter 45 which, after two counting steps, produces an output signal, and to the timing circuit 46. For a predetermined period of time, such as 100 milliseconds, this timing circuit produces an output pulse by which, in cooperation with the output signal of the counter 46, via an AND circuit 48 and an OR circuit 49 and a further gate circuit 50, the gate circuits 40 and 41 are switched to the conductive state. When a clock pulse 35 arrives during this period of time, the first timing circuit 43 which is triggered by the clock pulse, performs the switching of the gate circuits 40 and 41 to the conducting state, by producing an output signal of e.g., t2=1 second and applying it, via the OR circuit 49 and the gate circuit 50 to the control inputs 51 of the gate circuits 40 and 41. Simultaneously, the clock pulses 35 are applied to the counting input 52 of the clock counter 42 which, after a predetermined number of counted pulses, produces an output signal at its output 53. By this output signal the gate circuit 50 and, consequently, the gate circuits 40 and 41 in the data and clock line are switched to the nonconducting state, thus ending the storing of the data pulses into the shift register 39 in the pattern as given by the bar code. In this example of embodiment each bar code sentence to be scanned contains the same, given number of pattern clocks adjusted by the clock counter 42, i.e., upon reaching the number of counting steps thereof, it produces an output signal. As soon as a signal appears at the output 53, which is forwarded as a release signal to a not particularly shown evaluating device, the shift register 39, for example via a readout line 54 connected to its clock input T, may be read out serially into the evaluating device. After the readout process, the reconditioning circuit arrangement is again restored to normal so as to be ready for the next scanning operation.

The timing circuit 46 prevents the scanning circuit from being activated by recordings other than the bar code sentences as printed on the recording medium. The timing circuit 43 avoids the occurrence of reading errors which may be caused by a too hesitatingly performed scanning or by the interruption of a scanning operation. If the operation of the timing circuit 46 is finished prior to the switching on of the timing circuit 41, it resets the counter 45. If the operation of the timing circuit 43 is finished prior to the end of the storing, i.e. prior to the occurrence of an output signal of the counter 42, it restores the reconditioning circuit 36 to its initial position.

We claim:

1. Bar code readable with an optical reading device comprising
    a plurality of characters each formed by a certain sequence of code bars and intervening spaces separating said code bars from one another, the widths of the spaces between the code bars and the widths of the code bars amounting to at least one predetermined modular pattern width; and
    means for optically subdividing those of said spaces whose widths amount to at least twice said modular pattern width into separate spaces, including counting marks interposed in said spaces at a spacing of at least one modular pattern width from the respective neighboring code bar, said counting marks having such optical properties that the amount of light reflected during scanning of the respective counting marks lies between that reflected by said space and that reflected by said code bar.

2. The bar code as claimed in claim 1, wherein said secondary counting marks are lines each having a width that amounts to about one third of said modular pattern width.

3. The bar code as claimed in claim 1, wherein said counting marks include counting bars, with the widths of each said counting bars at least corresponding to that of said modular pattern width, the reflectance of said secondary counting bars differing distinctly from the reflectance of said code bars and from that of said spaces, and ranging between them.

4. The bar code as claimed in claim 3, wherein said counting bars are constituted by one of a dot pattern and a line pattern.

5. The bar code as claimed in claim 4, wherein said pattern covers almost half of the surface of said counting bars.

6. An optical reading device for reading bar code characters each of which includes a plurality of code bars and adjacent spaces, as well as counting marks situated in the respective spaces at a distance amounting to at least one modular width from the closest code bar when the width of the respective space amounts to at least twice the modular pattern width, the counting marks having such optical properties that the amount of light reflected therefrom lies between that reflected by the space and that reflected by the code bar, comprising
    means for scanning the bar code characters operative for issuing electrical signals of first, second and third predetermined values when scanning a blank space, a blank space with a counting mark therein, and a code bar, respectively;
    means for issuing, in response to said electrical signals, a first series of pulses only upon occurrence of said second and third values, and a second series of pulses only upon occurrence of said third values; and
    means for processing said first and second pulses to provide an output signal only when the pulses of said first and second pulses coincide.

7. The optical reading device as claimed in claim 1, wherein said scanning means includes a reading station including a photo-receiver circuit, a first and a second peak rectifier circuit each connected to the output of said photo-receiver circuit said first peak rectifier circuit producing an output signal corresponding to the lowest signal value of the output signal of said photo-receiver circuit, and said second peak rectifier circuit producing an output signal corresponding to the maximum signal value of the output signal of said photo-receiver circuit, a first and a second voltage divider including a base connected to the output of said first peak rectifier circuit, said first voltage divider being connected with its other end to the output of said second peak rectifier circuit and, with its tap to the inputs of said two threshold switches said second voltage divider being connected, with its other end, to the signal input of said first threshold switch and to the output of said photo-receiver circuit, and being connected with its tap to the input of said second threshold switch (22), the division ratio of said first voltage divider being so adjusted that the voltage at its tapping point lies between the voltage value of the signal appearing at the output of said first peak rectifier and the voltage value of the peaks of the pulses of said output signal produced by said counting marks at the output of said photo-receiver circuit, and that said second voltage divider has a smaller division ratio than said first voltage divider in such a way that the voltage value of said peaks of said pulses as produced by said counting marks in the output signal of said photo-receiver circuit, and the tapping point of said second voltage divider is smaller than the voltage value at the tapping point of said first voltage divider.

8. The optical reading device as claimed in claim 7, wherein said processing means includes a shift register whose data input via a gate circuit, is connected to the output of said first threshold switch, and whose clock input is connected to the output of said second threshold switch, and a counter having an input which is connected to the clock input of said shift register and an output which is connected to the control inputs of the gate circuits and which, after a counted number of pulses which is equal to the number of pattern clocks associated with one scanning distance of the bar code, produces at its put an output signal by which said gate circuits are switched to the nonconducting state, and which triggers the interrogation of said shift register.

9. The optical reading device as claimed in claim 8, wherein said processing means further includes a timing circuit which is connected with its input to the clock input of said shift register and, with its output to the control inputs of said gate circuits and which, at the beginning of a pulse applied to its input, produces an output pulse of predetermined duration.

10. The optical reading device as claimed in claim 9, wherein said processing means further includes a second counter having an input connected to the output of said first threshold switch which, in response to a predetermined number of input pulses, produces an output signal, a second timing circuit connected to either one of the output and to the input of said second counter which, in response to a pulse applied to its input, produces an output pulse of predetermined duration, and an AND circuit connected to the output of said second counter and to the output of said second timing circuit, and having an output connected to the control inputs of said gate circuits.

11. The optical reading device as claimed in claim 7 wherein said reading station has a scanning surface with a diameter which almost equals one modular pattern width of the character pattern.

12. The optical reading device as claimed in claim 6 wherein said issuing means includes a first and a second threshold switch connected to the output of the scanning means and operative for issuing said first and said second series of pulses, respectively.

* * * * *